(12) United States Patent
Hasegawa

(10) Patent No.: US 7,400,085 B2
(45) Date of Patent: *Jul. 15, 2008

(54) ELECTROLUMINESCENT PHOSPHOR, PROCESS FOR PRODUCING THE SAME, AND ELECTROLUMINESCENT DEVICE CONTAINING THE SAME

(75) Inventor: Kazuhiro Hasegawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

This patent is subject to a terminal disclaimer.

(21) Appl. No.: 11/198,320

(22) Filed: Aug. 8, 2005

(65) Prior Publication Data
US 2007/0001585 A1 Jan. 4, 2007

(30) Foreign Application Priority Data
Aug. 10, 2004 (JP) ............... P.2004-233091

(51) Int. Cl.
*H01J 1/62* (2006.01)
*H01J 63/04* (2006.01)

(52) U.S. Cl. .............. 313/503; 252/301.6 S; 428/917; 313/506; 313/502

(58) Field of Classification Search ......... 313/498–512; 252/301.6 S; 428/411.1; 423/566.1
See application file for complete search history.

(56) References Cited

U.S. PATENT DOCUMENTS

| 5,643,496 | A | * | 7/1997 | Brese et al. | ........... 252/301.6 S |
| 7,014,793 | B2 | * | 3/2006 | Chenot et al. | ......... 252/301.6 S |
| 7,252,790 | B2 | * | 8/2007 | Kappe et al. | .......... 252/301.6 S |
| 2005/0189518 | A1 | * | 9/2005 | Arakawa | .............. 252/301.6 S |
| 2006/0192486 | A1 | | 8/2006 | Ogawa | |
| 2007/0159063 | A1 | * | 7/2007 | Kubota et al. | ............... 313/502 |

FOREIGN PATENT DOCUMENTS

| JP | 4-51571 B2 | 8/1992 |
| JP | 11-204254 A | 7/1999 |
| JP | 2001-18358 A | 7/2001 |
| JP | 2002-226845 A | 8/2002 |
| WO | WO 2006046564 A1 * | 5/2006 |

* cited by examiner

*Primary Examiner*—Mariceli Santiago
*Assistant Examiner*—Jose M Diaz
(74) *Attorney, Agent, or Firm*—Birch, Stewart, Kolasch & Birch, LLP

(57) ABSTRACT

An electroluminescent phosphor comprising ZnS-based phosphor core particles and a coating layer provided on the individual core particles, the core particles having a mean particle size of 0.1 to 15 μm with a coefficient of variation of particle size distribution less than 35% and containing at least 30%, based on total particles, of particles having at least 10 stacking faults with an interplanar spacing of 5 nm or less.

14 Claims, 4 Drawing Sheets

ELECTROLUMINESCENT PHOSPHOR, PROCESS FOR PRODUCING THE SAME, AND ELECTROLUMINESCENT DEVICE CONTAINING THE SAME

FIELD OF THE INVENTION

This invention relates to a ZnS-based electroluminescent phosphor, a process for producing the same, and an electroluminescent device containing the same.

BACKGROUND OF THE INVENTION

The state-of-the-art electroluminescent (hereinafter EL) devices are known to have the problem of deterioration in brightness of the EL phosphor by moisture. Countermeasures taken against this problem include packaging an EL device in a moisture proof film such as a fluoropolymer film or a polymer film laminated with an oxide barrier coat as disclosed in JP-B-4-51571. However, the moisture proof films are expensive. Another approach is to form a coating layer of a moisture proof inorganic material on EL phosphor particles by fluidized bed coating technology as proposed in JP-A-11-204254. The problem of this technique is that coated EL phosphor particles suffer from reduction of luminescence efficiency by the action of oxygen, water vapor, heat, etc. during formation of the coating layer. A method of forming a coating layer on EL phosphor particles in a solution is disclosed in JP-A-2001-185358 and JP-A-2002-226845, which has a disadvantage, as compared with the above-mentioned fluidized bed coating, that the coating layer is inferior in continuity, resulting in a failure to exhibit sufficient moisture resistance.

SUMMARY OF THE INVENTION

An object of this invention is to provide an EL phosphor having high luminescence efficiency and durability.

Another object of the invention is to provide a process of producing the EL phosphor.

Still another object of the invention is to provide a dispersion type EL device with excellent uniformity of light emission and an EL device with improved durability.

These objects are accomplished by the following:

(1) An EL phosphor comprising ZnS-based phosphor particles and a coating layer on the individual particles. The particles have an mean particle size of 0.1 to 15 μm with a coefficient of variation of particle size distribution less than 35% and contain at least 30%, based on the total particles, of particles having 10 or more stacking faults with an interplanar spacing of 5 nm or less.

(2) The EL phosphor of (1), wherein the ratio of the mean thickness of the coating layer to the mean particle size of the particles ranges from 0.001 to 0.1.

(3) The EL phosphor of (1) or (2), wherein the ZnS-based EL phosphor particles contain at least one element selected from the group consisting of Cu, Mn, Ag, and a rare earth element as an activator.

(4) The EL phosphor of (1), (2) or (3), wherein the ZnS-based phosphor particles contain at least one element selected from the group consisting of Cl, Br, I, and Al as a co-activator.

(5) The EL phosphor of any one of (1) to (4), wherein the ZnS-based phosphor particles contain at least one element selected from the group consisting of Au, Sb, Bi, and Cs as an additive.

(6) The EL phosphor of any one of (1) to (5), wherein the coating layer contains at least one compound selected from the group consisting of an oxide, a nitride, a hydroxide, a fluoride, a phosphoric acid salt, diamond-like carbon, and an organic compound.

(7) A process of producing the EL phosphor of any one of (1) to (6). The process includes fluidizing the ZnS-based phosphor particles and feeding a raw material of the coating layer to the fluidized particles to deposit the raw material, or to cause the raw material to react, on the surface of the particles thereby to form the coating layer.

(8) The process of (7), wherein the fluidized bed is any one of a gas-fluidized bed, an agitated fluidized bed, a vibro-fluidized bed, and a tumbling fluidized bed.

(9) The process of (7) or (8), wherein the phosphor particles are fluidized in the presence of a fluidization accelerator having a greater mean particle size than the ZnS-based phosphor particles.

(10) Another process of producing the EL phosphor of any one of (1) to (6). The process includes dispersing the ZnS-based phosphor particles in a solvent and feeding a raw material of the coating layer to the dispersed particles to deposit the raw material, or to cause the raw material to react, on the surface of the particles thereby to form the coating layer.

(11) Still another process of producing the EL phosphor of anyone of (1) to (6). The process includes mixing the ZnS-based phosphor particles and a raw material of the coating layer and applying a mechanical and thermal energy to the mixture to form the coating layer.

(12) A dispersion type EL device having an opposing pair of electrodes at least one of which is transparent, a phosphor layer between the electrodes, and a dielectric layer between the electrodes. The phosphor layer contains the EL phosphor of any one of (1) to (6).

(13) The dispersion type EL device of (12), further having at least one intermediate layer between the transparent electrode and the phosphor layer.

(14) The dispersion type EL device of (13), wherein the intermediate layer is an organic polymer layer, an inorganic compound layer or a composite layer composed of an organic polymer layer and an inorganic compound layer and has a thickness of 10 nm to 100 μm.

Despite of the involvement of coating processing, the coated phosphor particles of the present invention exhibit extremely high EL efficiency owing to the specific structure of the core phosphor particles, i.e., a small particle size and coefficient of variation of particle size distribution and many planar stacking faults in the inside. Furthermore, the coating layer markedly enhances the durability of the phosphor particles thus providing an EL device with an extended service life. The coating layer is considered to effectively protect the phosphor from moisture and prevents elution of ions from the phosphor particles.

The EL phosphor of the invention having a small particle size and coefficient of variation of particle size has good dispersibility to form a uniform and thin phosphor layer, which allows for applying an electric field of increased intensity to achieve high brightness. Moreover, the EL phosphor of the invention emits light having greatly improved granularity and is therefore best suited for transmitted lighting for high image quality transmission photographs and inkjet images.

The present invention also provides a fluidized bed coating process specially designed for forming a coating layer on such small EL phosphor particles. The fluidized bed coating is carried out under specific conditions with the aid of a fluidization accelerator thereby to produce the EL phosphor of the invention at high efficiency and with good reproducibility without involving agglomeration.

The present invention also provides an EL device containing the EL phosphor of the invention in a phosphor layer, in which an intermediate layer is provided between a transparent electrode and the phosphor layer. The intermediate layer prevents deterioration of the transparent electrode to bring about further improvement of durability of the EL device. The effect of the intermediate layer is beneficial particularly where the coating layer of the EL phosphor has insufficient ion barrier properties.

DETAILED DESCRIPTION OF THE INVENTION

Figure 1:
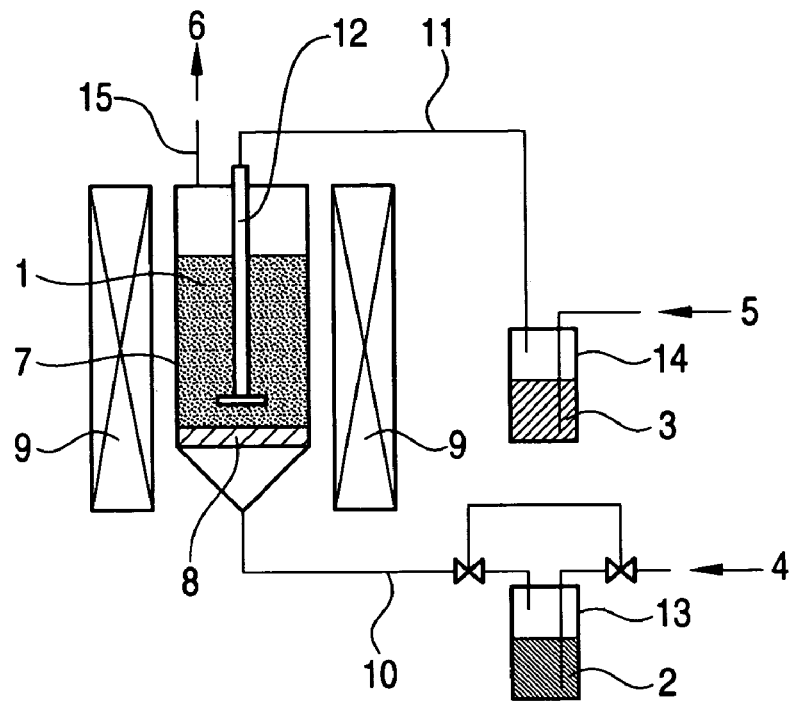
FIG. 1 is a schematic illustration of a gas-fluidized bed reaction system used in the preparation of coated EL phosphor particles according to the invention.

The EL phosphor, the process of producing the EL phosphor, and the EL device according to the present invention will be described in detail.

The ZnS-based phosphor particles to be coated to provide the EL phosphor of the invention, hereinafter sometimes referred to as core particles, have a mean particle size of 0.1 to 15 μm, preferably 1 to 10 μm. With such a small particle size, the thickness of a phosphor layer can reduced, and the intensity of the electric field applied can be increased.

The core particles have a coefficient of variation of particle size distribution less than 35%, preferably less than 30%. The recited range secures improvements in dispersibility of the EL phosphor particles and packing density of the EL phosphor particles in the phosphor layer thereby to improve granularity of light emitted from the resulting EL device.

At least 30%, preferably 50% or more, still preferably 70% or more, of the total core particles are those having inside 10 or more stacking faults at a mean interplanar spacing of 5 nm or less. A structure with more planar stacking faults is preferred for increasing the EL efficiency.

The EL phosphor core particles having the recited characteristics are obtained as follows. Precursors that provide a ZnS-based EL phosphor include commercially available high-purity ZnS and a uniformly activated ZnS precursor. The latter is preferred. The activated ZnS precursor is advantageously prepared by hydrothermal synthesis, homogeneous precipitation or spray pyrolysis. Whichever process is followed, a Zn salt is allowed to react in a solution containing the Zn salt and a salt of an activator to produce a ZnS precursor having the activator incorporated therein. Examples of suitable activators include Cu, Mn, Ag, and rare earth elements. Cu is preferred of them. The amount of the activator to be added varies according to the kind. Cu, for instance, is preferably added in an amount of $1 \times 10^{-4}$ to $1 \times 10^{-2}$ mol, more preferably $5 \times 10^{-4}$ to $5 \times 10^{-3}$ mol, per mole of ZnS. When an activator-free precursor is used, a water soluble Cu compound (e.g., $CuSO_4$ or $Cu(NO_3)_2$) is added to a suspension of ZnS particles in water to precipitate $Cu_xS$ on the ZnS particles. The suspension after the reaction is preferably washed with distilled water several times to remove by-produced $ZnSO_4$.

Co-activators can be used. Suitable co-activators include Cl, Br, I, and Al. The co-activator is preferably used in the same amount as the activator. The halogen co-activators are introduced from a flux (hereinafter described), whereas Al should be added in the form of a separate compound, such as $Al(NO_3)_3$.

In addition to the activator and the co-activator, it is preferred to add an additive selected from Au, Sb, Bi, and Cs, particularly Au, to ZnS. Addition of such an additive results in remarkable extension of EL life because deterioration of, for example, $Cu_xS$ crystals that are a source of electrons supplied to the EL phosphor can be suppressed by the additive. This effect is particularly pronounced with small EL phosphor particles. The amount of Au to be added is preferably $1 \times 10^{-5}$ to $1 \times 10^{-3}$ mol, more preferably $5 \times 10^{-5}$ to $5 \times 10^{-4}$ mol, per mole of ZnS.

The precursor is then fired in a solid phase as has conventionally been practiced. The precursor containing the activator is blended with a flux such as an alkali metal halide, an alkaline earth metal halide, an ammonium halide or a zinc halide, which also serves as a source of a halogen co-activator. In using Al as a co-activator, an Al compound is also blended. In using Cs as an additive, a Cs halide is also added and mixed. Mixing is carried out either in dry process using a mortar, a turbular mixer, etc. or, for further uniformity, in wet process in which the materials are once suspended in distilled water and dried. The amount of the flux is preferably 1% to 80% by weight, still preferably 20% to 60% by weight, based on ZnS. With an insufficient amount of the flux, crystal growth can fail to proceed sufficiently. Too large an amount of the flux can cause generation of corrosive, toxic gas. The blend is put in an alumina crucible and fired at a temperature of 900° to 1200° C. To let crystal growth proceed thoroughly and to cause the activator to diffuse uniformly throughout ZnS, the firing time is preferably 30 minutes to 12 hours, still preferably 1 to 6 hours. The firing atmosphere that can be used includes oxidative atmospheres such as air and oxygen, inert atmospheres such as nitrogen and argon, reducing atmospheres such as a hydrogen-nitrogen mixed atmosphere and a carbon-oxygen mixed atmosphere, and sulfurizing atmospheres such as hydrogen sulfide and carbon disulfide.

The fired product removed from the crucible is preferably subjected to sufficient repetition of acid washing and water washing to remove the excess of the flux, reaction by-products, ZnO resulting from oxidation of ZnS, and so forth. The washed particles are dried in a vacuum dryer, etc. to give an intermediate phosphor having a wurtzite structure.

For the purpose of increasing the stacking fault density thereby to improve the brightness, it is preferred that the intermediate phosphor be then subjected to mechanical stress followed by re-firing. Mechanical stress can be given to the intermediate particles by utilizing a ball mill, ultrasonic waves, hydrostatic pressure, etc. In any case, stress should be applied uniformly under such a load that does not destroy the particles. The thus stressed particles are re-fired at 500° to 900° C. If desired, an Sb compound or a Bi compound may be added at this stage, which is preferred for improving the EL phosphor life. The amount of Sb or Bi to be added is preferably $1 \times 10^{-5}$ to $1 \times 10^{-3}$ mol per mole of ZnS. By this second firing, the most part of the crystals are converted into zincblende structure crystals. The firing time and atmosphere for re-firing are selected from those recited above with respect to the first firing.

The re-fired product is preferably subjected to sufficient repetition of acid washing and water washing to remove the produced ZnO layer and the surface layer containing disturbances and distortions from the surface of the particles. Since Cu is used as an activator, an excess Cu compound precipitates on the surface of the particles during the re-firing; therefore the particles are preferably subjected to a repetition of washing with acetic acid, a cyanide, ammonia, a Cu chelating agent, etc. and water washing. The washed particles are dried in a vacuum dryer, etc. to yield a ZnS-based EL phosphor having a mean particle size of 0.1 to 15 µm with a coefficient of variation of particle size distribution less than 35% and containing at least 30%, based on the total particles, of particles having 10 or more stacking faults having an interplanar spacing of 5 nm or less.

As described, the EL phosphor core particles having a desired particle size and particle size distribution can be prepared by properly selecting the firing conditions. The process of preparing the core particles is not limited thereto, nevertheless. For example, EL phosphor having a mean particle size greater than 15 µm is classified by dry screening, wet screening or using a gas cyclone, a hydrocyclone or an elutriator to obtain particles having a desired mean particle size and particle size distribution. Alternatively, the large EL phosphor particles can be reduced to a desired size with a desired size distribution by means of a mortar, a ball mill, a jet mill or a like pulverizer.

The EL phosphor of the present invention is the above-described EL phosphor core particles having a coating layer formed on the surface thereof. The coating layer preferably has a mean thickness of 0.01 to 1 µm, still preferably 0.05 to 0.5 µm. The mean thickness of the coating layer as referred to herein is an arithmetic mean of measurements of at least ten particles. The coating layer thickness on an SEM cross-section is measured at arbitrarily chosen three points per particle. With the thickness being in the preferred range, the coating layer provides a satisfactory barrier against moisture and ion elution without lessening the electric field intensity applied to the EL phosphor core thus minimizing reduction of luminance and increase of threshold voltage for the onset of light emission.

The thickness of the coating layer is preferably decided depending on the mean particle size of the core particles. A 1 µm thick coating layer on a 1 µm diameter core particle, for example, would result in reduction of intensity of the electric field applied to the core particle. Accordingly, the ratio of the mean thickness of the coating layer to the mean particle size of the core particles preferably ranges from 0.001 to 0.1, still preferably from 0.002 to 0.05.

The composition of the coating layer is not particularly limited. Materials that can be used to make the coating layer include oxides, nitrides, hydroxides, fluorides, phosphoric acid salts, diamond-like carbon (hereinafter, DLC), and organic compounds. Mixtures or mixed crystals of these materials are also useful. Furthermore, these materials can be used in combination to build up a multilayered coating layer. Specific examples of suitable materials are $SiO_2$, $Al_2O_3$, $TiO_2$, $ZrO_2$, $HfO_2$, $Ta_2O_5$, $Y_2O_3$, $La_2O_3$, $CeO_2$, $BaTiO_3$, $SrTiO_3$, lead zirconate titanate (PZT), $Si_3N_4$, AlN, $Al(OH)_3$, $MgF_2$, $CaF_2$, $Mg_3(PO_4)_2$, $Ca_3(PO_4)_2$, $Sr_3(PO_4)_2$, $Ba_3(PO_4)_2$, and fluoropolymers. It is preferred that the coating layer be a continuous layer free from pinholes or cracks.

The coating layer can be formed by the following three processes.

The first process includes the steps of fluidizing the EL phosphor core particles and feeding a raw material of the coating layer to the fluidized particles to deposit the raw material, or to cause the raw material to react, on the surface of the particles.

Figure 2:
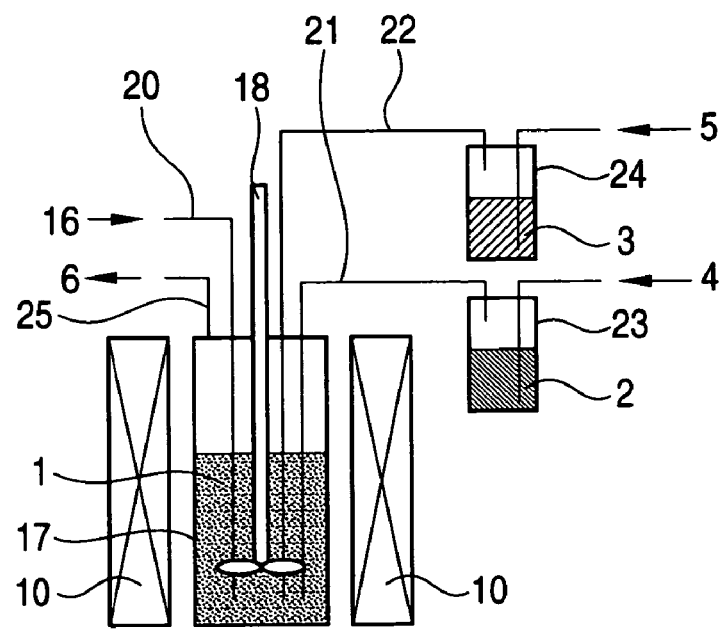
FIG. 2 is a schematic illustration of an agitated fluidized bed reaction system used in the preparation of coated EL phosphor particles according to the invention.
Figure 3:
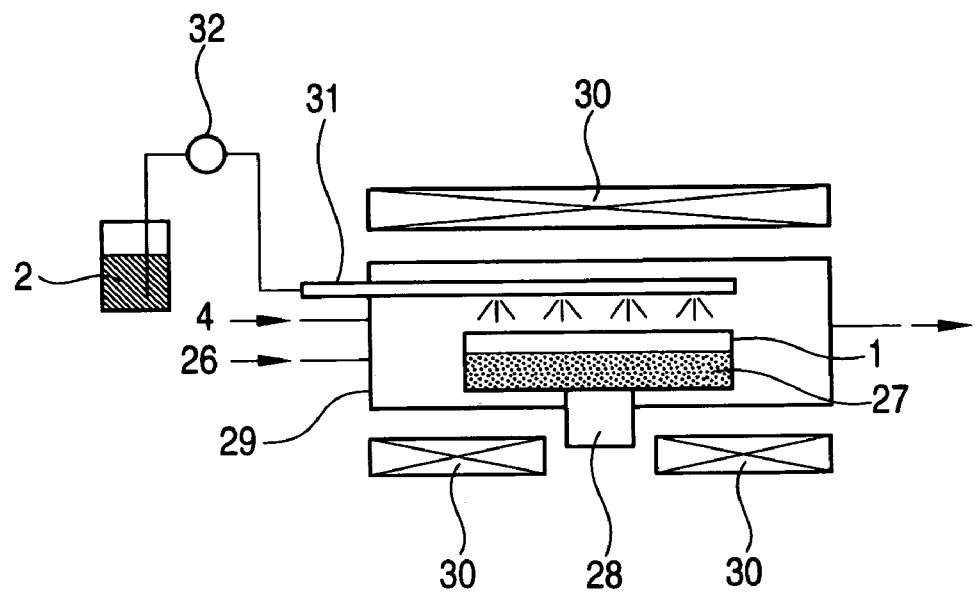
FIG. 3 is a schematic illustration of a vibro-fluidized bed reaction system used in the preparation of coated EL phosphor particles according to the invention.

Fluidization of the EL phosphor core particles can be achieved by an appropriate known technique including a gas-fluidized bed, an agitated fluidized bed, a vibro-fluidized bed, and a tumbling fluidized bed. A gas fluidized bed is a technique in which EL phosphor core particles is put in a cylindrical container, and a carrier gas is introduced from the bottom of the container through a porous plate as illustrated in FIG. 1, thereby to float and fluidize the particles. An agitated fluidized bed is a technique in which EL phosphor core particles in a container is directly fluidized by an impeller agitator, etc. as shown in FIG. 2. A vibro-fluidized bed is a technique in which a container containing EL phosphor particles is vibrated mechanically or electrically as illustrated in FIG. 3. A tumbling fluidized bed is a process in which a horizontal or tilted cylindrical container containing EL phosphor core particles is rotated to fluidize the particles.

To obtain a uniform coating layer, a gas fluidized bed is particularly preferred. Small size particles are liable to be difficult to fluidize because of strong tendency to agglomerate. It is therefore preferred to add to the EL phosphor core particles a fluidization accelerator having a greater particle size than the EL phosphor core particles. The mean particle size of the fluidization accelerator is preferably about 2 to 5 times the mean particle size of the core particles. The fluidization accelerator is preferably a substance inert to the EL phosphor at a reaction temperature, such as $SiO_2$, $Al_2O_3$ or $ZrO_2$. The fluidization accelerator preferably has a spherical shape, which is the bed fit for fluidization.

Feeding and reaction of a coating layer material on the surface of the fluidized EL phosphor core particles can be carried out by, for example, allowing a gaseous coating layer raw material borne in a carrier gas flow and a reactant gas introduced through the same route or separate routes to react on the surface of the core particles. Alternatively, a gaseous coating layer raw material is pyrolyzed to form a coating layer without using a reactant gas. Gaseous coating layer raw materials include alkoxides, alkyl compounds, chlorides, hydrides, and hydrocarbons. While the reaction is usually effected at a reactor temperature of about 100° to 500° C., temperatures not higher than 300° C. are recommended to reduce thermal damage to the EL phosphor. Feeding a liquid coating layer raw material to the fluidized bed with a spray, etc. is also preferred.

A coating layer of an oxide, a nitride, a hydroxide, DLC, etc. can be formed by the above-described process. For instance, a $TiCl_4$ solution is bubbled with $N_2$ gas into a gas phase and allowed to react with water vapor-containing $N_2$ gas on the surface of the core particles to form a $TiO_2$ precursor coating layer; or an alkylaluminum and anhydrous ammonia gas are allowed to react to form an AlN coating layer.

The second process includes the steps of dispersing the EL phosphor core particles in a solvent and feeding a raw material of the coating layer to the dispersed particles to deposit the raw material, or to cause the raw material to react, on the surface of the particles.

Figure 5:
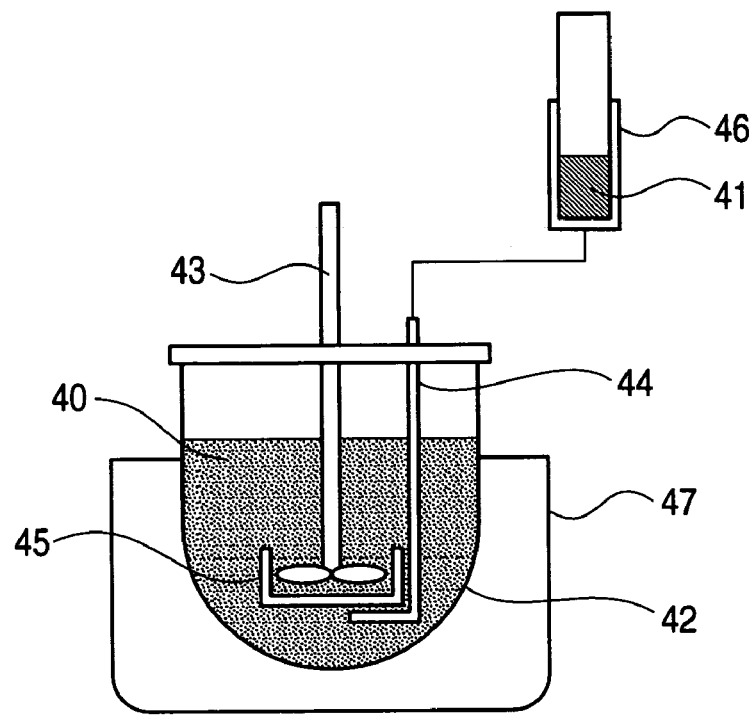
FIG. 5 is a schematic illustration of a liquid phase reactor used in the preparation of coated EL phosphor particles according to the invention.

In the process the EL phosphor core particles are introduced into a reaction vessel together with a solvent and dispersed using, e.g., an impeller agitator. The reaction vessel preferably has a cylindrical shape with a conical or hemispherical bottom. The impeller includes screw impellers, twisted blade impellers, and paddle impellers. A screw/paddle impeller that creates both a circumferential flow and a vertical axial flow is preferred. It is preferred to provide a strainer around the impeller as illustrated in FIG. 5 to make a vertical flow stronger. The solvent that is used preferably includes water, an organic solvent, and a mixture thereof. As a special solvent, urea heated above the melting point is also useful. A dispersant such as a surface active agent can be added to the solvent.

Formation of the coating layer in a solvent is preferably performed by (1) dissolving a coating layer raw material in the solvent having the core particles dispersed therein and adding a reactant solution or (2) adding a solution of the coating layer raw material and the reactant solution simultaneously to the solvent having the core particles dispersed therein. The coating layer raw material solution and the reactant solution are preferably added to the site where the dispersion is agitated most vigorously. The coating layer raw material solution and the reactant solution are added by means of a known constant rate pump or by orifice feed. A syringe pump providing a flow with minimum pulsation is preferred. It is preferred that the ion concentrations in the reactor be monitored to separately control the feed rates of the coating layer raw material solution and the reactant solution. The reactant may be added as such in the form of solid when in using, for example, molten urea as a solvent.

The reaction temperature can be controlled by directly heating the reaction vessel using a mantle heater, etc. but is preferably controlled by circulating hot water or cool water through a jacket around the reaction vessel. The reaction temperature preferably ranges from 40° to 80° C. in using water or an organic solvent as a solvent or from 130° to 150° C. in using urea. These reaction temperatures are those of the reaction system under atmospheric pressure. Reaction under pressure in an autoclave is preferred as well from the viewpoint of densification of the coating layer and acceleration of decomposition and condensation reaction. In this case, the reaction temperature can exceed 100° C. up to the critical temperature. Addition of a solution into an autoclave is preferably conducted by use of a delivery pump having pressure resistance higher than the inner pressure of the autoclave.

A coating layer of an oxide, a hydroxide, a phosphoric acid salt, a fluoride, etc. can be formed by the second process. For instance, when an EL phosphor is dispersed in an alcohol solution of a titanium alkoxide, and about 10 times as much water diluted with an alcohol as the titanium alkoxide is added to the dispersion as a reactant solution, a $TiO_2$ precursor coating layer is formed on the phosphor particles. When an EL phosphor is dispersed in an aqueous solution of $Na_3(PO_4)_2$, and an aqueous solution of $MgCl_2$ is added thereto as a reactant solution, an $Mg_3(PO_4)_2$ coating layer is formed on the core particles. When an EL phosphor is dispersed in an alcohol solution of $Mg(CH_3COO)_2$, and $CF_3COOH$ diluted with an alcohol is added thereto as a reactant solution, an $MgF_2$ coating layer is formed on the core particles.

It is preferred that the coated EL phosphor particles obtained by the first and the second processes be subjected to annealing. Where a hydroxide is produced in parts, annealing results in almost perfect conversion of the hydroxide to a corresponding oxide. Moreover, annealing densifies the coating layer, resulting in improved moisture proofness and ion barrier properties.

The third process includes mixing the EL phosphor core particles and a raw material of the coating layer and applying a mechanical and thermal energy to the mixture to form the coating layer.

The coating layer material can be firmly fixed on the surface of the EL phosphor core particles upon receipt of a mechanical and thermal energy. Equipment that can impart such a mechanical and thermal energy to particles includes Hybridizer (from Nara Machinery Co., Ltd.) and Theta Composer (from Tokuju Corp.). Although the coating materials suited to this process are organic compounds such as polymers, inorganic compounds are also employable. It is also preferable to form an organic compound layer first and then form an inorganic compound layer thereon, or to form a coating layer from a mixture of an organic compound and an inorganic compound.

The EL phosphor according to the present invention is preferably used as incorporated into a phosphor layer of an EL device. An EL device is basically composed of a pair of opposing electrodes at least one of which is transparent and a phosphor layer interposed between the electrodes. The EL device preferably has a dielectric layer between the phosphor layer and the electrode. The EL device preferably has an intermediate layer between the transparent electrode and the phosphor layer.

The phosphor layer includes a layer in which the EL phosphor (coated EL phosphor particles) of the invention are dispersed in a binder. Useful binders include polymers having a relatively high dielectric constant such as cyanoethyl cellulose resins, polyethylene, polypropylene, polystyrene resins, silicone resins, epoxy resins, and polyvinylidene fluoride. The dielectric constant of the phosphor layer can be adjusted by incorporating 5 to 100 parts by weight of fine particles having a high dielectric constant, such as $BaTiO_3$ or $SrTiO_3$, per 100 parts by weight of the binder. The EL phosphor can be dispersed in a binder by use of a homogenizer, a planetary mixer, a roll mill, an ultrasonic disperser, etc.

The phosphor layer is formed by applying a coating composition containing the EL phosphor particles. The coating composition essentially contains the EL phosphor particles, a binder, and a solvent capable of dissolving the binder. The solvent includes acetone, methyl ethyl ketone, dimethylformamide, butyl acetate, and acetonitrile. The viscosity of the coating composition is preferably adjusted within a range of from 0.1 to 5 Pa·s, still preferably from 0.3 to 1.0 Pa·s. A coating composition having too low a viscosity not only has difficulty in forming a coating film with a uniform thickness but can allow the EL phosphor particles to settle out in the composition with time. A coating composition having too high a viscosity tends to be difficult to apply at a relatively high speed. The viscosity of the coating composition as referred to here is the one measured at 16° C., which is the temperature of the coating compositions when applied in Examples given later.

The coating composition is preferably applied continuously on a transparent electrode formed on a plastic support or a dielectric layer (described infra) formed on the back side electrode using a slide coater, an extrusion coater, a doctor blade coater, etc. to a dry thickness of 0.5 to 30 μm. The coefficient of variation of phosphor layer thickness is preferably 12.5% or smaller, still preferably 5% or smaller. The above recited layer thickness is smaller than that of the phosphor layer of conventional EL devices. As a result, with the other driving conditions being equal, the voltage applied to the phosphor layer in the present invention becomes higher than in the conventional EL devices, resulting in increased brightness. This means that the same level of brightness as obtained by the conventional EL devices can be secured at a lower driving voltage or a lower frequency. The results are power saving and reduction in vibration and noise. A still preferred thickness of the phosphor layer is 15 μm or smaller.

Where a dielectric layer (described infra) is provided next to the phosphor layer, the total thickness of the phosphor layer and the dielectric layer is preferably 3 to 10 times the mean particle size of the phosphor particles.

The packing density of the EL phosphor particles in the phosphor layer is not particularly limited but preferably 60% to 95% by weight, still preferably 80% to 90% by weight. In the present invention, the EL phosphor particles having a mean particle size of 15 μm or smaller, which brings about improvements of thickness uniformity and surface smoothness of the phosphor layer. Furthermore, the number of the particles per unit area greatly increases with the particle size reduction, resulting in marked reduction of subtle unevenness of light emission.

The dispersion type EL device of the invention preferably contains a dielectric layer in addition to the electrodes and the phosphor layer. The dielectric layer is preferably provided between, and adjacent to, the phosphor layer and the back electrode. The dielectric layer can be of any dielectric material having a high dielectric constant, high insulating properties, and a high breakdown voltage. Such materials are selected from metal oxides and nitrides. Specific examples are $TiO_2$, $BaTiO_3$, $SrTiO_3$, $PbTiO_3$, $KNbO_3$, $PbNbO_3$, $Ta_2O_5$, $BaTa_2O_6$, $LiTaO_3$, $Y_2O_3$, $Al_2O_3$, $ZrO_2$, AlON, and ZnS. The dielectric layer may be a crystal layer formed by thin film processing or a particulate layer.

The dielectric layer can be provided on one or both sides of the phosphor layer. A particulate dielectric layer is formed by applying a coating composition containing dielectric material particles with a slide coater, an extrusion coater, a doctor blade coater, etc. in the same manner as for the phosphor layer. The particle size of the dielectric material is preferably sufficiently smaller than that of the EL phosphor particles. Specifically, the particle size of the dielectric particles is preferably 1/1000 to 1/3 that of the EL phosphor particles. Thin film processing techniques include sputtering, vacuum evaporation, and sol-gel using a Ba or Sr alkoxide. The dielectric layer formed by thin film processing usually has a thickness of 0.1 to 10 μm.

The dielectric layer is preferably a particulate layer formed by applying a coating composition (dispersion) essentially containing the dielectric particles, a binder, and a solvent capable of dissolving the binder. Binders for the dielectric layer are the same as those for the phosphor layer. Useful solvents include acetone, methyl ethyl ketone, dimethylformamide, butyl acetate, and acetonitrile. The viscosity of the coating composition is preferably adjusted within a range of from 0.1 to 5 Pa·s, still preferably from 0.3 to 1.0 Pa·s. A coating composition having too low a viscosity not only has difficulty in forming a coating film with a uniform thickness but can allow the dielectric particles to settle out in the composition with time. A coating composition having too high a viscosity tends to be difficult to apply at a relatively high speed. The viscosity of the coating composition as referred to here is the one measured at 16° C., which is the temperature of the coating compositions when applied in Examples given later.

The transparent electrode that can be used in the EL device of the invention can be of any material commonly used in the art. Suitable materials include oxides such as ITO (indium tin oxide), ATO (antimony-doped tin oxide), ZTO (zinc tin oxide), AZO (aluminum doped zinc oxide), GZO (gallium doped zinc oxide); a multilayer structure having a thin silver film sandwiched between high refractive layers; and π-conjugated polymers such as polyaniline and polypyrrole. A fine wire may be arranged on the transparent electrode in a pattern such as grid or comb to improve electric conductivity.

The surface resistivity of the transparent electrode is preferably 300Ω or less, more preferably 100Ω or less, even more preferably 30Ω or less, for the EL device to exhibit high brightness. The surface resistivity is measured in accordance with the method specified in JIS K6911. In order to minimize voltage reduction with broadening of the EL device, it is advisable to form a bus electrode with a conductive paste on the inner periphery of the transparent electrode by screen printing or casting. The area of the bus electrode is 1% or more based on the area of the phosphor layer. To supply electric power to the phosphor layer more efficiently, the area of the bus electrode is preferably 2% or more. Because the bus electrode should be increased in area with the area of the phosphor layer, the area of the bus electrode is expressed in area ratio to the total area of the phosphor layer. At least 1% is required to allow for reduction in phosphor layer thickness and to increase the driving voltage or frequency so as to achieve high brightness. Nevertheless, a bus electrode area ratio of 10% or more is unfavorable because it produces no further improvements in EL device performance. On the contrary, too wide a bus electrode area only results in an increase of the non-lighting area or a need to broaden the device area.

The back electrode is provided on the side from which light is not extracted. It is made of any conductive material commonly employed in this type of back electrode. The back electrode is formed by applying a conductive paste having fine conductive particles dispersed in a binder on a substrate or superposing a metal material such as copper, aluminum, gold or silver, preferably of a sheet form, on a substrate. A graphite sheet may be used instead of the metal sheet. The back electrode preferably has a thermal conductivity of 100 W/m·K or higher, still preferably 200 W/m·K or higher.

When the electrode or electrodes are formed by coating a substrate with an electrode material, the above enumerated coating apparatus, such as a slide coater, an extrusion coater, and a doctor blade coater, can be used.

The EL device of the present invention preferably has at least one intermediate layer between the transparent electrode and the phosphor layer. The intermediate layer includes an organic polymer layer, an inorganic compound layer, and a composite layer composed of an organic polymer layer and an inorganic compound layer. It is preferred that there be at least one organic polymer layer as an intermediate layer between the transparent electrode and the phosphor layer. The thickness of the intermediate layer is preferably 10 nm to 100 μm, still preferably 100 nm to 30 μm, even still preferably 0.5 to 10 μm.

Organic polymers that can be used to make the intermediate layer include polyethylene, polypropylene, polystyrene, polyesters, polycarbonates, polyamides, polyether sulfones, polyvinyl alcohol, polysaccharides, e.g., pullulan, saccharose, and cellulose, polyvinyl chloride, fluororubber, polyacrylic esters, polymethacrylic esters, polyacrylamides, polymethacrylamides, silicone resins, cyanoethylpullulan, cyanoethylpolyvinyl alcohol, cyanoethylsaccharose, UV-curing resins obtained from polyfunctional acrylic ester compounds, and thermosetting resins obtained from epoxy compounds and cyanate compounds. The organic polymers may be either an insulator or a conductor.

The organic polymer or a precursor thereof is dissolved in an appropriate organic solvent, and the solution is applied to a transparent electrode or the phosphor layer to form an intermediate layer. Useful coating apparatus include the aforementioned slide coater, extrusion coater and doctor blade coater. The organic solvent includes dichloromethane, chloroform, acetone, methyl ethyl ketone, cyclohexanone, acetonitrile, dimethylformamide, dimethylacetamide, dimethyl sulfoxide, toluene, and xylene.

Various additives can be incorporated into the intermediate layer to impart desired functionality as long as substantial transparency of the layer is secured. The intermediate layer preferably has a transmission of 70% or more, still preferably 80% or more, at a wavelength of 550 nm. The intermediate layer may contain a dielectric substance such as barium titanate particles, a conductive substance such as tin oxide, indium oxide, tin-indium oxide or metal particles, or a colorant such as a dye, a fluorescent dye or a fluorescent pigment. Light-emitting particles may be present in the intermediate layer in such an amount that does not ruin the effects of the present invention (up to 30% of the luminance of the EL device).

Inorganic compounds that can be used to make the intermediate layer include $SiO_2$, metal oxides, and metal nitrides. The inorganic compound layer can be formed by sputtering, CVD or like techniques. The inorganic compound layer preferably has a thickness of 10 nm to 1 μm, still preferably 10 to 200 nm. A composite intermediate layer composed of an inorganic compound layer and an organic polymer layer is preferred as well.

It is preferred for the EL device of the invention to have an intermediate layer containing at least one organic polymer layer and having a thickness of 0.5 to 10 μm. The organic polymer is preferably selected from polyesters, polycarbonates, polyamides, polyether sulfones, fluororubber, polyacrylic esters, polymethacrylic esters, polyacrylamides, polymethacrylamides, silicone resins, cyanoethylpullulan, cyanoethylpolyvinyl alcohol, cyanoethylsaccharose, UV-curing resins obtained from polyfunctional acrylic ester compounds, and thermosetting resins obtained from epoxy compounds and cyanate compounds. Still preferred of these polymers are those having a softening point of 70° C. or higher, particularly those having a softening point of 100° C. or higher. A combination of two or more of these polymers is also preferably used.

Where the organic polymer of the intermediate layer has a high softening point, e.g., 200° C. or higher, another intermediate layer containing an organic polymer having a low softening point can be provided to improve the adhesion to the transparent electrode or the phosphor layer.

It is preferred that the EL device emit white light in view of applications as a light source. The emitted light can be made white preferably by changing the wavelength of part of the luminescence to green or red by use of a fluorescent pigment. The CIE chromaticity coordinates x, y of the light are preferably in a range of from 0.30 to 0.43 and of from 0.27 to 0.41, respectively. The fluorescent pigment may be incorporated into the phosphor layer or the dielectric layer together with the EL phosphor particles or the dielectric particles, or an independent layer containing the fluorescent pigment may be provided. Such an independent fluorescent pigment layer is preferably provided on the side of the phosphor layer opposite to the light output side rather than the light output side of the phosphor layer in view of effective utilization of the luminescence from the EL phosphor. Specifically, the fluorescent pigment layer is preferably provided between the phosphor layer and the dielectric layer. In this case, it is advisable to form a reflective layer containing a highly reflective white pigment between the fluorescent pigment layer and the phosphor layer to induce multiple scattering of luminescence in the fluorescent pigment layer thereby improving the wavelength conversion efficiency and also to allow for conversion to longer wavelengths.

It is desirable that each of the above-described layers be formed in a continuous processing line at least from application to drying. Drying processing is divided into a constant rate drying stage and a decreasing rate drying stage. In the present invention, each layer has a high proportion of a binder. If a layer is dried rapidly, only the surface dries while convection currents are created inside the coating layer to form Benard cells, and the solvent expands abruptly to cause blisters. Thus, rapid drying results in considerably poor coating film uniformity. To the contrary, if the drying temperature is too low in the final stage of drying, the solvent tends to remain in the coating layer and can influence subsequent processing steps, such as lamination with a moistureproof film. It is therefore recommended that the constant rate drying be carried out under a gentle condition and that the decreasing rate drying be effected at a temperature high enough to evaporate the solvent. The constant rate drying under gentle conditions can be carried out by dividing the drying chamber into a few zones, through which a base film runs, and the drying temperature is stepwise increased from the zone immediately after application.

The dispersion type EL device is preferably sealed in sealing film to be protected from the influences of outside moisture and oxygen.

The sealing film preferably has a water vapor transmission rate of 0.05 $g/m^2$/day or less, still preferably 0.01 $g/m^2$/day or less, and an oxygen transmission rate of 0.1 $cm^3/m^2$/day/atm or less, still preferably 0.01 $cm^3/m^2$/day/atm or less, both measured at 40° C. and 90% RH in accordance with JIS K7129. Laminate film composed of an organic layer and an inorganic layer is preferably used as such sealing film.

Organic materials that are preferably used to make the organic layer of sealing film include polyethylene resins, polypropylene resins, polycarbonate resins, and polyvinyl alcohol resins. Polyvinyl alcohol resins are still preferred. Water-absorbing resins such as polyvinyl alcohol resins are preferably dried to absolute dryness by, for example, vacuum heating before use. The laminate sealing film is obtained by forming the resin into film, e.g., by a coating method, and depositing an inorganic material on the resin film, e.g., by vacuum evaporation, sputtering or CVD. Examples of suitable inorganic materials include silicon oxide, silicon nitride, silicon oxynitride, silicon oxide/aluminum oxide, and aluminum nitride, with silicon oxide being particularly preferred. To ensure barrier properties against water vapor or oxygen and to prevent crack development in the inorganic layer due to bending, laminate film having three or more layers is preferably used. Such multilayered laminate film is obtained by, for example, alternately repeating the formation of the organic layer and the inorganic layer or bonding two or more organic layers each having an inorganic layer deposited thereon via an adhesive layer. The thickness of the organic layer is preferably 5 to 300 μm, still preferably 10 to 200 μm. The thickness of the inorganic layer is preferably 10 to 300 nm, still preferably 20 to 200 μm. The thickness of the laminate sealing film is preferably 30 to 1000 μm, still preferably 50 to 300 μm.

The EL device is sealed by placing the EL device between two sheets of the sealing film or in a fold of a sheet of the sealing film and adhering the periphery of the sealing film to itself. The EL device may be fabricated separately from the sealing step or may be fabricated directly on a sheet of sealing film using the sheet as a support. The sealing step is preferably conducted in vacuo or in a dried atmosphere with a controlled dew point.

In order to suppress vibration of the EL device, it is preferred to provide a buffer layer made of a shock-absorbing polymer or a polymer foamed with a blowing agent and/or a compensation electrode. The latter is provided to face the transparent electrode or the back electrode with an insulating layer therebetween.

The EL device of the present invention is preferably fabricated by (1) a method including applying a dielectric layer and a phosphor layer on a back electrode, such as aluminum foil, in that order and laminating a transparent electrode layer on the phosphor layer, (2) a method including applying a phosphor layer and a dielectric layer in that order on a transparent electrode and laminating a back electrode layer on the dielectric layer, or (3) a method including applying a phosphor layer on a transparent electrode, applying a dielectric layer on a back electrode, and bonding them with the phosphor layer and the dielectric layer inside. Laminating or bonding is preferably carried out by hot pressing between heated metal rollers or heated silicone-coated rollers.

EXAMPLES

The present invention will now be illustrated in greater detail with reference to Examples, but it should be understood that the invention is not construed as being limited thereto. Unless otherwise noted, all the percents and parts are by weight.

Preparation of EL Phosphor Particles:

(a) EL Phosphor Particles A

ZnS having a crystallite size of 20 nm and a mean particle size of 2 µm was prepared. Twenty-five grams were weighed out and put in a 300 ml beaker together with 200 ml of distilled water. The mixture was stirred with a magnetic stirrer to disperse all the ZnS particles. A solution of 0.064 g of $CuSO_4.5H_2O$ in 2 ml of distilled water was added to the ZnS dispersion with a buret over about 30 seconds. After completion of the addition, the stirring was continued for an additional 30 minute period. The system was then left to standstill until the ZnS particles settled out completely. The supernatant liquor was removed by decantation. The residual ZnS particles were washed three times each by adding 200 ml of distilled water, stirring for 10 minutes, allowing the dispersion to stand to let the particles settle out, and removing the supernatant liquid by decantation. The washed particles were dried in a hot air dryer at 120° C. for 4 hours to give Cu-doped ZnS.

The Cu-doped ZnS was blended with the flux and additive shown below in a mortar.

| Cu-doped ZnS | 25 g |
| Sodium chloride | 0.5 g |
| Barium chloride dihydrate | 1.0 g |
| Magnesium chloride hexahydrate | 2.1 g |

The resulting blend was put in an aluminum crucible, and the crucible was covered with a lid and placed in a muffle furnace at room temperature. The furnace temperature was elevated at a rate of 800° C./hr up to 1200° C., at which the blend was first fired for 1 hour in air. After the crucible was allowed to cool spontaneously to room temperature, the crucible was taken out of the furnace, and the first fired product was taken out of the crucible, washed successively with 500 ml of a 0.1M HCl aqueous solution and five 500 ml portions of distilled water, and dried in a hot air dryer at 120° for 4 hours to give intermediate phosphor particles represented by ZnS:Cu,Cl.

Five grams of the intermediate phosphor particles and 20 g of 1 mm diameter alumina balls were put in a 15 mm diameter glass bottle and milled at 10 rpm for 20 minutes. The ground product was screened through a 100 mesh sieve to collect the intermediate phosphor particles, which were put in an aluminum crucible. The crucible was closed with a lid and placed in a muffle furnace at room temperature. The temperature of the muffle furnace was raised at a rate of 400° C./hr up to 700° C., at which the particles were second fired in air for 4 hours. After completion of the second firing, the crucible was allowed to cool to room temperature in the furnace. The second fired product was taken out of the crucible, washed successively with 100 ml of a 10% KCN aqueous solution and five 500 ml portions of distilled water, and dried in a hot air dryer at 120° C. for 4 hours to yield EL phosphor particles A represented by ZnS:Cu,Cl.

(b) EL Phosphor Particles B

Cu-doped ZnS was prepared in the same manner as in (a) above. The Cu-doped ZnS was blended with the flux and additive shown below in a mortar.

| Cu-doped ZnS | 25 g |
| Strontium chloride hexahydrate | 27.3 g |
| Barium chloride dihydrate | 4.2 g |
| Magnesium chloride hexahydrate | 11.1 g |
| Chloroauric acid tetrahydrate | 0.0053 g |

The resulting blend was further processed in the same manner as for the EL phosphor particles A to yield EL phosphor particles B represented by ZnS:Cu,Cl,Au.

(c) EL Phosphor Particles C

EL phosphor particles C represented by ZnS:Cu,Cl, Sb were prepared in the same manner as for EL phosphor particles B, except for adding 0.03 g of antimony trichloride to the intermediate phosphor particles to be second fired.

(d) EL Phosphor Particles D

EL phosphor particles D represented by ZnS:Cu,Cl,Bi were prepared in the same manner as for EL phosphor particles B, except for adding 0.04 g of bismuth trichloride to the intermediate phosphor particles to be second fired.

(e) EL Phosphor Particles E

Cu-doped ZnS was prepared in the same manner as in (a) above. The Cu-doped ZnS was blended with the flux and additive shown below in a mortar.

| Cu-doped ZnS | 25 g |
| Strontium chloride hexahydrate | 27.3 g |
| Barium chloride dihydrate | 4.2 g |
| Magnesium chloride hexahydrate | 11.1 g |
| Cesium chloride | 4.5 g |

The resulting blend was further processed in the same manner as for the EL phosphor particles A to yield EL phosphor particles E represented by ZnS:Cu,Cl,Cs.

(f) EL Phosphor Particles F

EL phosphor particles F represented by ZnS:Cu,Cl were prepared in the same manner as for EL phosphor particles B, except for performing the first firing at 1100° C.

(g) EL Phosphor Particles G

EL phosphor particles G represented by ZnS:Cu,Cl were prepared in the same manner as for EL phosphor particles A, except for omitting the ball milling of the intermediate phosphor particles.

Evaluation of EL Phosphor Particles:

The EL phosphor particles A to G were evaluated for the following items. The results are shown in Table 1.
1. Mean particle size (median diameter measured with a particle size distribution analyzer LA-920 from Horiba, Ltd.)
2. Coefficient of variation of particle size (calculated on LA-920)
3. Interplanar spacing of stacking fault (the phosphor particles were ground with an agate mortar and pestle and the fragment was observed with a transmission electroluminescent microscope (TEM) to measure the number of the stacking faults and the maximum interplanar spacing of the stacking faults.)
4. Stacking fault frequency (100 fragments of the ground particles were observed with a TEM to measure the frequency of the stacking faults.)

TABLE 1

| EL Phosphor Particles | Median Diameter (μm) | Coefficient of Variation (%) | Stacking Faults | | |
|---|---|---|---|---|---|
| | | | Interplanar Spacing (nm) | Count | Frequency (%) |
| A | 20.7 | 43.7 | 4 | >10 | 65 |
| B | 14.2 | 34.0 | 4 | >10 | 81 |
| C | 13.7 | 33.4 | 4 | >10 | 75 |
| D | 13.2 | 33.6 | 4 | >10 | 70 |
| E | 12.3 | 33.9 | 4 | >10 | 79 |
| F | 8.7 | 31.9 | 4 | >10 | 60 |
| G | 14.4 | 34.1 | 8 | >10 | 25 |

As can be seen from the results in Table 1, EL phosphors A to F contain particles having more than 10 stacking faults at an interplanar spacing less than 5 nm in a proportion of 50% or more, whereas EL phosphor G has a larger interplanar spacing and a frequency less than 30%.

Preparation of Coated EL Phosphor Particles:

(i) Coated EL Phosphor Particles A to G

A $TiO_2$ coating layer was formed on the EL phosphor particles A to G by use of a gas-fluidized bed reaction system illustrated in FIG. 1.

The gas-fluidized bed reaction system comprises a cylindrical reactor 7 having a porous plate 8 at the bottom and a heater 9 surrounding the reactor 7 for reaction temperature control. A feed line 10 for feeding a carrier gas for fluidizing EL phosphor particles 1 and a gasified coating layer material to the reactor 7 is connected to the lower side of the porous plate 8. A reactant gas inlet pipe 12 connected to a reactant gas feed line 11 is set in the reactor 7 near the porous plate 8. Each of the feed lines 10 and 11 are heated by the respective heaters. A coating layer material tank 13 and a reactant tank 14 where a coating layer material 2 and a reactant 3 are stored and gasified, respectively, are provided in the respective feed lines. The coating layer material 2 and the reactant 3 are gasified by bubbling with the respective carrier gases 4 and 5. The unreacted gas or by-produced gas 6 is discharged from the reactor 7 through an exhaust duct 15, which is connected to a scrubber (not shown).

A hundred grams of each of EL phosphor particles A to G were put in the reactor, with the exception that particles F were mixed with an equivalent weight of spherical alumina particles having a mean particle size of 25 μm and 100 g of the mixture was put in the reactor because the particles F alone could not be fluidized sufficiently. A solution of $TiCl_4$, a coating layer material, was put in the tank 13 maintained at 35° C., and distilled water, a reactant, was put in the tank 14 maintained at 30° C. Argon gas as a carrier gas was fed to the reactor 7 through the porous plate 8 at a rate of 500 cc/min to fluidize the EL phosphor particles. After the reactor was heated to 200° C., bubbling the $TiCl_4$ solution with argon gas and bubbling the distilled water with argon gas were started at the same time, and these vapor phase materials were each fed to the reactor at a rate of 300 cc/min. Two hours later, the vapor phase feeds were stopped, the reactor cooled, and the EL phosphor particles recovered to yield coated EL phosphor particles A to G. The resulting coated particles A to G were found to have a $TiO_2$ coating layer on their surface with a mean thickness of 150 nm.

(ii) Coated EL Phosphor Particles H

Coated EL phosphor particles H were prepared in the same manner as for the coated EL phosphor particles B, except for replacing $TiCl_4$ (coating layer material) with trimethylaluminum and using $O_2$ as a reactant gas. The resulting particles were found to have an $Al_2O_3$ coating layer on their surface with a mean thickness of 170 nm.

(iii) Coated EL Phosphor Particles I

Coated EL phosphor particles I were prepared in the same manner as for the coated EL phosphor particles B, except for replacing $TiCl_4$ (coating layer material) with hexakisdimethylamidodialuminum and using $NH_3$ as a reactant gas. The resulting particles were found to have an AlN coating layer on their surface with a mean thickness of 110 nm.

(iv) Coated EL Phosphor Particles J

An $SiO_2$ coating layer was formed on the EL phosphor particles B by use of an agitated fluidized bed reaction system illustrated in FIG. 2. The agitated fluidized bed reaction system comprises a cylindrical reactor 17, a paddle agitator 18 in the reactor 17, and a heater 19 surrounding the reactor 17 for reaction temperature control. Feed lines 20, 21, and 22 for feeding an auxiliary carrier gas 16 for fluidizing EL phosphor particles 1, a gasified coating layer material, and a reactant gas to the reactor 17 are led near the bottom of the reactor 17. Each of the feed lines 20, 21, and 22 are heated by the respective heaters. A coating layer material tank 23 and a reactant tank 24 where a coating layer material 2 and a reactant 3, respectively, are stored and gasified are provided in the respective feed lines. The coating layer material 2 and the reactant 3 are gasified by bubbling with the respective carrier gases 4 and 5. The unreacted gas or by-produced gas 6 is discharged from the reactor 7 through an exhaust duct 25, which is connected to a scrubber (not shown).

A hundred grams of EL phosphor particles B were put in the reactor 17. A solution of $SiCl_4$, a coating layer material, was put in the tank 23 maintained at 35° C., and distilled water, a reactant, was put in the tank 24 maintained at 30° C. Argon gas as an auxiliary carrier gas 16 was fed to the reactor 17 through the line 20 at a rate of 200 cc/min, and the paddle agitator 18 was rotated at 30 rpm, thereby to fluidize the EL phosphor particles 1. After the reactor was heated to 200° C., bubbling the $SiCl_4$ solution with argon gas and bubbling the distilled water with argon gas were started at the same time, and these vapor phase materials were each fed to the reactor at a rate of 300 cc/min. Two hours later, the vapor phase feeds were stopped, the reactor cooled, and the EL phosphor particles recovered to yield coated EL phosphor particles J. The resulting coated particles J were found to have an $SiO_2$ coating layer on their surface with a mean thickness of 100 nm.

(v) Coated EL Phosphor Particles K

A $Ta_2O_5$ coating layer was formed on the EL phosphor particles B by use of a vibro-fluidized bed reaction system illustrated in FIG. 3. The vibro-fluidized bed reaction system comprises a horizontal phosphor container 27, an unbalance mass type vibration generator 28, a reactor 29 enclosing the phosphor container 27, and a heater 30 surrounding the reactor 29 for reaction temperature control. A coating layer material 2 is fed to the reactor 29 in liquid form through a coating material feed nozzle 31 placed above the vibro-fluidized bed by a delivery pump 32. A carrier gas 4 and a reactant gas 26 are fed to the reactor 29 through the respective lines. The unreacted gas or by-produced gas is discharged from the reactor 29 through an exhaust duct, which is connected to a scrubber (not shown).

A hundred grams of EL phosphor particles B were put in the phosphor container 27 and fluidized by generating vibration at 1 kHz with the vibration generator 28. Nitrogen gas (carrier gas 4) was fed at a rate of 200 cc/min. After the reactor 29 was heated to 400° C., a 0.1% ethanol solution of $TaCl_5$ (coating layer material 2) was sprayed through the nozzle 31 onto the fluidized EL phosphor particles at a rate of 100 cc/min for 10 minutes. After the EL phosphor particles were dried for 10 minutes, the carrier gas feed was changed over to oxygen gas (reactant gas 26) feed, and oxygen was fed at a rate of 200 cc/min for 20 minutes. These operations from coating material feed, drying, and reactant gas feed were repeated 10 times. The reactor was cooled, and the EL phosphor particles were recovered to yield coated EL phosphor particles K. The resulting coated particles J were found to have a $Ta_2O_5$ coating layer on their surface with a mean thickness of 100 nm.

(vi) Coated EL Phosphor Particles L

Figure 4:
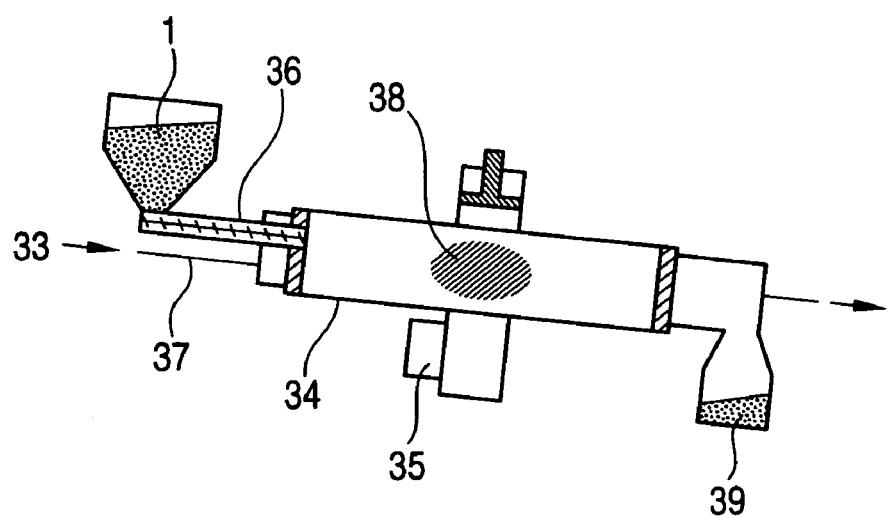
FIG. 4 is a schematic illustration of a tumbling fluidized bed reaction system used in the preparation of coated EL phosphor particles according to the invention.

A DLC coating layer was formed on the EL phosphor particles B by use of a tumbling fluidized bed reaction system illustrated in FIG. 4. The tumbling fluidized bed reaction system is a modified rotary kiln. The tumbling fluidized bed reaction system comprises a rotary quartz tube 34 at an inclination angle of 1° downward from the horizontal, a microwave generator 35 mounted at approximately the middle of the tube 34 to irradiate the inside of the tube 34, a powder feeder 36 attached to the loading end of the tube 34 from which to feed EL phosphor particles 1, and a gas feed pipe 37 connected to the loading end of the tube 34 through which a coating material gas and a back pressure gas 33 are fed. The trap end of the tube 34 is connected to a vacuum pump (not shown) to evacuate the tube 34. The EL phosphor particles 1 fed into the tube 34 slowly move downward while being tumbled, pass through a plasma generation region 38, and are collected in a container 39 at the trap end of the tube 34.

EL phosphor particles B were fed into the tube 34 from the powder feeder 36, and the tube 34 was rotated at 10 rpm. A 1:99 mixed gas of $CH_4$ and $H_2$ (a coating material and a reactant gas) was fed to the tube 34 while evacuating the tube by the vacuum pump to maintain the inner pressure at 5000 Pa. Microwave (2.45 GHz, 300 W) from the microwave generator 35 was applied to create a plasma inside the tube 34 thereby forming DLC on the surface of the EL phosphor particles. The resulting coated particles L were found to have a DLC coating layer on their surface with a mean thickness of 50 nm.

(vii) Coated EL Phosphor Particles M

An $Mg_3(PO_4)_2$ coating layer was formed on the EL phosphor particles B by use of a liquid phase reactor illustrated in FIG. 5. The liquid phase reactor comprises a cylindrical vessel 42 with a hemispherical bottom, a stirrer 43 having a screw/paddle impeller that forms a vertical flow, a strainer 45 surrounding the screw/paddle impeller, and at least one liquid feed pipe 44 the feed end of which is located beneath the strainer 45. The liquid feed pipe 44 is connected to a syringe pump 46 to feed a reactant solution 41. The vessel 42 is heated or cooled with a water jacket 47.

In the vessel 42 were put 2.5 liters of distilled water and 12.2 g of $(NH_4)_3PO_4 \cdot 3H_2O$ to make an aqueous solution. To the aqueous solution was suspended 100 g of EL phosphor particles B to prepare a reaction mother liquid. The reaction mother liquid was heated to 40° C. and stirred at 500 rpm. An aqueous solution of 18.3 g of $MgCl_2 \cdot 6H_2O$ in 100 ml of distilled water as a reactant solution was put in the syringe pump 46. The syringe pump operated to feed the reactant solution to the vessel 42 at a rate of 2 ml/min. After completion of the reactant solution feed, the suspension was heated up to 90° C. and aged at that temperature for 1 hour. The suspension was cooled to room temperature, followed by filtration by suction using No. 5C filter paper. Three one-liter portions of distilled water were successively poured onto the filter cake to wash the coated EL phosphor particles by suction filtration. The washed filter cake was dried in a vacuum dryer at 120° C. for 4 hours, followed by annealing in air at 300° C. for 1 hour to give coated EL phosphor particles M. The resulting coated particles M were found to have an $Mg_3(PO_4)_2$ coating layer on their surface with a mean thickness of 200 nm.

(viii) Coated EL Phosphor Particles N

An $MgF_2$ coating layer was formed on the EL phosphor particles B by use of the same liquid phase reactor as used in (vii) above.

In the vessel 42 were put 2.5 liters of isopropyl alcohol and 7.0 g of $Mg(CH_3COO)_2 \cdot 4H_2O$ to make an aqueous solution. To the aqueous solution was suspended 100 g of EL phosphor particles B to prepare a reaction mother liquid. The reaction mother liquid was heated to 40° C. and stirred at 500 rpm. An aqueous solution of 12.5 ml of $CF_3COOH$ in 87.5 ml of isopropyl alcohol as a reactant solution was put in the syringe pump 46. The syringe pump operated to feed the reactant solution to the vessel 42 at a rate of 2 ml/min. After completion of the reactant solution feed, the suspension was aged for 2 hours. After the aging, the suspension was cooled to room temperature, followed by filtration by suction using No. 5C filter paper. Three one-liter portions of distilled water were successively poured onto the filter cake to wash the coated EL phosphor particles by suction filtration. The washed filter cake was dried in a vacuum dryer at 120° C. for 4 hours, followed by annealing in air at 300° C. for 1 hour to furnish coated EL phosphor particles N. The resulting coated particles N were found to have an $MgF_2$ coating layer on their surface with a mean thickness of 50 nm.

(ix) Coated EL Phosphor Particles O

Figure 6:
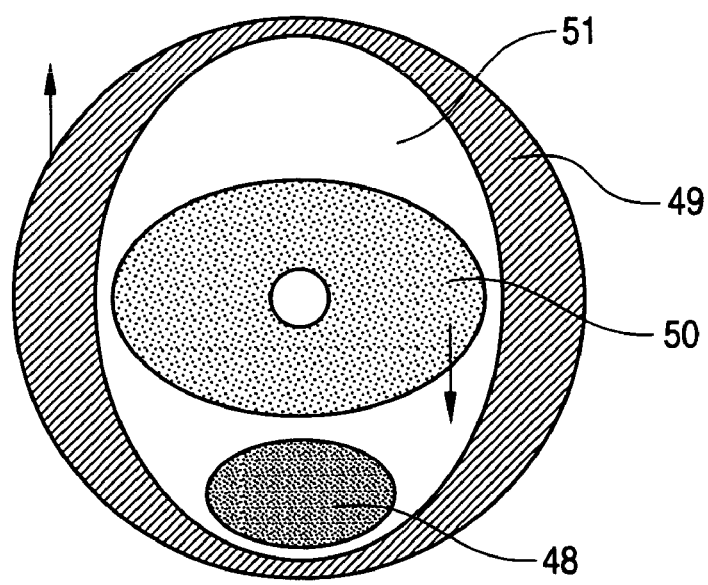
FIG. 6 is a schematic illustration of a composite particles forming apparatus used in the preparation of coated EL phosphor particles according to the invention.

A tetrafluoroethylene coating layer was formed on EL phosphor particles B by use of a composite particle forming apparatus, Theta Composer, illustrated in FIG. 6. The apparatus comprises a larger oval rotor 49 having an oval hollow and a smaller oval rotor 50 the major axis of which is slightly smaller than the minor axis of the oval hollow. The small oval rotor 50 is coaxially installed inside the larger oval rotor 49. The two oval rotors 49 and 50 rotate in opposite directions. A mixture 48 of EL phosphor particles and a coating layer material is put in the space 51 formed between the two rotors.

Twenty grams of EL phosphor particles B and 0.4 g of tetrafluoroethylene particles having a mean particle size of 2 μm (TFW-3000F, available from Seishin Enterprise Co., Ltd.) were put in Theta Composer, and the two rotors were rotated at 1000 rpm for 5 minutes. The EL phosphor particles were recovered to give coated EL phosphor particles O. The resulting coated particles O were found to have a tetrafluoroethylene coating layer on their surface with a mean thickness of 200 nm.

Evaluation of Coated EL Phosphor Particles:

(1) Coating Layer Thickness (Measured on SEM Micrograph)
(2) Barrier Properties (Coat Continuity)

The particles were immersed in a 0.1M $AgNO_3$ solution. Those which underwent no color change were grated P (pass), and those whose color darkened were graded F (fail).

EL Device Fabrication:

EL Devices were fabricated using the coated EL phosphor particles A to O and non-coated EL phosphor particles A to G as follows.

A transparent electrode film (designated I) composed of a 100 μm thick PET support and an ITO electrode layer having a surface resistivity of 100Ω was prepared.

A transparent electrode film (designated II) composed of transparent electrode film I and an intermediate layer was prepared. The intermediate layer was formed by applying a 14% solution of bisphenol A/phthalic acid (terephthalic acid: isophthalic acid=1:1) polyester (U-100, available from Unitica, Ltd.) in dichloromethane to the ITO electrode by dip coating to a dry thickness of 1.5 μm.

A hundred parts of the EL phosphor (coated or non-coated) and 25 parts of a cyanoethylcellulose resin (Cyanoresin CR-S, from Shin-Etsu Chemical Co., Ltd.) as a binder were added to a dimethylformamide as a binder solvent, and the mixture was stirred in a propeller mixer at 3000 rpm to prepare an EL phosphor-containing coating composition having a viscosity of 0.5 Pa·s at 16° C.

The viscosity of the coating composition was measured with a viscometer, Visconic ELD.R and Viscometer Controller E-200, rotor No. 71, available from Tokyo Keiki at 20 rpm and at a liquid temperature of 16° C. (hereinafter the same).

Ninety parts of barium titanate (BT-5, mean particle size: 120 nm, available from Cabot Specialty Chemicals, Inc.) and a cyanoethylcellulose resin (Cyanoresin CR-R, from Shin-Etsu Chemical) as a binder were dispersed in dimethylformamide as a binder solvent in a propeller mixer at 3000 rpm to prepare a dielectric particles-containing coating composition having a viscosity of 0.5 Pa·s at 16° C.

The dielectric particles-containing coating composition was applied to a 75 μm thick aluminum foil (back electrode) with a doctor blade coater to a dry thickness of 20 μm and dried at 120° C. to form a dielectric layer on the back electrode. The EL phosphor-containing coating composition was applied to the dielectric layer with a doctor blade coater to a dry thickness of 30 μm and dried at 120° C. to prepare a laminate having the back electrode, the dielectric layer, and the phosphor layer in that order.

Figure 7:
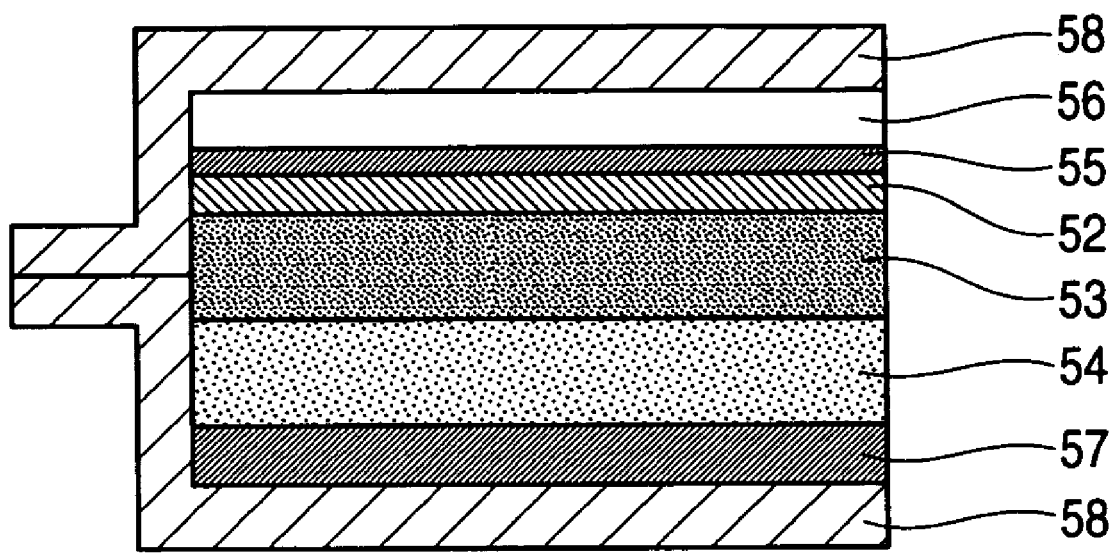
FIG. 7 is a schematic cross-section of an EL device according to the present invention.

The phosphor layer side of each laminate was laminated with transparent electrode film I or II by hot pressing through a laminator at 190° C. The resulting sheet structure was cut to A4 size. A lead wire was connected to each of the transparent electrode and the back electrode, and the whole laminate was sealed in a moistureproof film to obtain an EL device. The layer structure of the EL device using transparent electrode film II is schematically illustrated in FIG. 7. The EL device shown in FIG. 7 is a laminate of a back electrode 57, a dielectric layer 54, a phosphor layer 53, an intermediate layer 52, a transparent electrode layer 55, and a PET support 56, the laminate being sealed in a moistureproof film 58.

Evaluation of EL Device:

An alternating voltage of 150 V was applied to the EL device at an adjusted frequency so as to give a luminance of 300 $cd/m^2$. The initial luminescence efficiency and the half-life period of luminance measured under the driving conditions are shown in Table 2. The luminance was measured with a luminance meter (Topcom BM9). The luminescence efficiency was calculated by measuring the power consumption with Power Multimeter 2721 (from NF Corp.).

TABLE 2

| Example No. | EL Phosphor Coated Particles | EL Phosphor Core Particles | Coat Continuity | Transparent Electrode Film | Half-life Period of Core Particles (H0) | Half-life Period of Coated Particles (H1) | Luminescence Efficiency of Core Particles (K0) | Luminescence Efficiency of Coated Particles (K1) | K1/K0 |
|---|---|---|---|---|---|---|---|---|---|
| Compar. Example 1 | A | (A) | P | I | 420 | 610 | 8.5 | 5.2 | 0.61 |
| Compar. Example 2 | G | (G) | P | I | 180 | 250 | 4.2 | 2.5 | 0.60 |
| Example 1 | B | (B) | P | I | 680 | 960 | 16.8 | 14.0 | 0.83 |
| Example 2 | C | (C) | P | I | 560 | 840 | 15.4 | 12.4 | 0.81 |
| Example 3 | D | (D) | P | I | 580 | 850 | 15.8 | 12.6 | 0.80 |
| Example 4 | E | (E) | P | I | 520 | 760 | 15.2 | 11.8 | 0.78 |
| Example 5 | F | (F) | P | I | 550 | 800 | 14.3 | 12.2 | 0.85 |
| Example 6 | H | (B) | P | I | 680 | 930 | 16.8 | 14.0 | 0.83 |
| Example 7 | I | (B) | P | I | 680 | 1030 | 16.8 | 14.6 | 0.87 |
| Example 8 | J | (B) | P | I | 680 | 810 | 16.8 | 12.2 | 0.73 |
| Example 9 | K | (B) | F | I | 680 | 860 | 16.8 | 12.6 | 0.75 |
| Example 10 | L | (B) | P | I | 680 | 880 | 16.8 | 10.9 | 0.65 |
| Example 11 | M | (B) | F | I | 680 | 780 | 16.8 | 13.9 | 0.83 |
| Example 12 | N | (B) | F | I | 680 | 810 | 16.8 | 14.4 | 0.86 |
| Example 13 | O | (B) | F | I | 680 | 750 | 16.8 | 12.4 | 0.74 |
| Example 14 | B | (B) | P | II | 680 | 1110 | 16.8 | 13.7 | 0.82 |
| Example 15 | K | (B) | F | II | 680 | 1150 | 16.8 | 12.1 | 0.72 |

As can be seen from the comparison between H0 and H1 shown in Table 2, the EL devices containing the coated EL phosphor particles of the invention (Examples 1 to 15) enjoy improvement on luminance half-life period compared with the corresponding EL devices using non-coated EL phosphors. With this improvement, the EL devices of the invention achieve extension of a practically effective service life. Although the difference is insubstantial in the amount of improvement on luminance half-life period due to formation of a coating layer between Examples and Comparative Example 1 (large size EL phosphor core particles) or Comparative Example 2 (low planar stacking fault frequency), the reduction in luminescence efficiency due to the formation of a coating layer, represented by K1/K0, experienced in Examples 1 to 15 is understandably greatly smaller than in Comparative Examples 1 and 2. It has not yet been elucidated why the reduction in luminescence efficiency can be remarkably suppressed by reducing the size of the core particles and increasing the stacking fault frequency. In any event, this is an appreciable effect that has been revealed for the first time and characterizes the present invention.

In addition, the results of Examples 14 and 15 prove that the improvement on luminance half-life period is synergistically enhanced by introducing an intermediate layer. Specifically, comparison between the results of Examples 1 and 14 and the results of Examples 9 and 15 verifies that the synergistic effect is more noticeable when the coating layer has insufficient barrier properties (Examples 9 and 15). Furthermore, while not manifested in the data of luminance half-life periods, a combination of the intermediate layer and coated EL phosphor particles brought about reduction of blackening phenomenon of the EL device as compared with those devices using non-coated EL phosphor particles. Where, in particular, the coating layer has poor continuity, there is room for improvement in ion barrier properties. In this connection, a combination of the intermediate layer and the coated EL phosphor particles will be effective.

Additionally, the EL phosphor core particles used in the EL devices of the invention have a smaller particle size with a smaller coefficient of size variation than those used in Comparative Example 2. Therefore, the EL devices of the invention have much improved granularity due to reduced structure mottle.

For reference, it is seen from the half-life periods of the core particles (H0) of Examples 1 to 6 that the life of the EL phosphor itself can be extended by introducing Au, Sb, Bi or Cs into the ZnS matrix.

This application is based on Japanese Patent application JP 2004-233091, filed Aug. 10, 2004, the entire content of which is hereby incorporated by reference, the same as if set forth at length.

What is claimed is:

1. An electroluminescent phosphor comprising ZnS-based phosphor core particles and a coating layer provided on the individual core particles, the core particles having a mean particle size of 0.1 to 15 μm with a coefficient of variation of particle size distribution less than 35% and containing at least 30%, based on total particles, of particles having at least 10 stacking faults with an interplanar spacing of 5 nm or less.

2. The electroluminescent phosphor according to claim 1, wherein the core particles contains at least 50%, based on total particles, of particles having at least 10 stacking faults with an interplanar spacing of 5 nm or less.

3. The electroluminescent phosphor according to claim 1, wherein the core particles contains at least 70%, based on total particles, of particles having at least 10 stacking faults with an interplanar spacing of 5 nm or less.

4. The electroluminescent phosphor according to claim 1, wherein a ratio of a mean thickness of the coating layer to a mean particle size of the core particles ranges from 0.001 to 0.1.

5. The electroluminescent phosphor according to claim 1, wherein a ratio of a mean thickness of the coating layer to a mean particle size of the core particles ranges from 0.002 to 0.05.

6. The electroluminescent phosphor according to claim 1, wherein the ZnS-based phosphor core particles contain at least one element selected from the group consisting of Cu, Mn, Ag, and a rare earth element as an activator.

7. The electroluminescent phosphor according to claim 1, wherein the ZnS-based phosphor core particles contain at least one element selected from the group consisting of Cl, Br, I, and Al as a co-activator.

8. The electroluminescent phosphor according claim 1, wherein the ZnS-based phosphor core particles contain at least one element selected from the group consisting of Au, Sb, Bi, and Cs.

9. The electroluminescent phosphor according to claim 1, wherein the ZnS-based phosphor core particles contain Au.

10. The electroluminescent phosphor according to claim 1, wherein the coating layer contains at least one compound selected from the group consisting of an oxide, a nitride, a hydroxide, a fluoride, a phosphoric acid salt, diamond-like carbon, and an organic compound.

11. A process for producing the electroluminescent phosphor according to claim 1, comprising:
fluidizing the ZnS-based phosphor core particles in the presence of a fluidization accelerator having a greater mean particle size than the ZnS-based phosphor core particles and
feeding a raw material of the coating layer to the fluidized particles to deposit the raw material, or to cause the raw material to react, on surface of the particles to form the coating layer.

12. A dispersion type electroluminescent device comprising an opposing pair of electrodes at least one of which is transparent, a phosphor layer between the electrodes, and a dielectric layer between the electrodes, the phosphor layer containing the electroluminescent phosphor according to claim 1.

13. The dispersion type electroluminescent device according to claim 12, further comprising at least one intermediate layer between the transparent electrode and the phosphor layer.

14. The dispersion type electroluminescent device according to claim 12, wherein the intermediate layer is an organic polymer layer, an inorganic compound layer or a composite layer comprising an organic polymer layer and an inorganic compound layer and has a thickness of 10 nm to 100 μm.

* * * * *